(12) United States Patent
Lim

(10) Patent No.: US 11,676,491 B2
(45) Date of Patent: Jun. 13, 2023

(54) COMMUNICATION DEVICE FOR PLATOONING IN VEHICLE AND COMMUNICATION METHOD THEREFOR

(71) Applicants: Hyundai Motor Company, Seoul (KR); Kia Motors Corporation, Seoul (KR)

(72) Inventor: Jong Su Lim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 682 days.

(21) Appl. No.: 16/539,353

(22) Filed: Aug. 13, 2019

(65) Prior Publication Data

US 2020/0327813 A1 Oct. 15, 2020

(30) Foreign Application Priority Data

Apr. 15, 2019 (KR) .......................... 10-2019-0043857

(51) Int. Cl.
*G08G 1/00* (2006.01)
*G05D 1/02* (2020.01)
(Continued)

(52) U.S. Cl.
CPC ............. *G08G 1/22* (2013.01); *G05D 1/0291* (2013.01); *G08G 1/096791* (2013.01); *G08G 1/20* (2013.01); *H04W 4/46* (2018.02)

(58) Field of Classification Search
CPC ...... G08G 1/22; G08G 1/096791; G08G 1/20; H04W 4/46; G05D 1/0291
See application file for complete search history.

(56) References Cited

U.S. PATENT DOCUMENTS 10,089,882 B2 10/2018 Pandy
10,259,456 B2 4/2019 Park et al.
(Continued)

FOREIGN PATENT DOCUMENTS

CN 106853827 A 6/2017
CN 107293110 A 10/2017
(Continued)

OTHER PUBLICATIONS

Notification of First Office Action for Chinese Patent Application No. 2022072602721530, from China National Intellectual Property Administration, dated Jul. 29, 2022, 13 pages.

*Primary Examiner* — Hussein Elchanti
(74) *Attorney, Agent, or Firm* — Fox Rothschild LLP

(57) ABSTRACT

A communication device for a platooning vehicle is provided and includes a communication circuit; a memory; and a control circuit electrically connected with the communication circuit and the memory. The control circuit transmits, via the communication circuit, platooning information to another platooning vehicle in the platooning group when platooning is initiated and receives, via the communication circuit, information from an outside vehicle that is not part of the platooning group, the information including identification information of the outside vehicle. The information from the outside vehicle is processed when the identification information of the outside vehicle matches identification information of the other platooning vehicle, the identification information of the other platooning vehicle previously stored in a memory of the other platooning vehicle. The information receiving from the outside vehicle is stopped when the identification information of the outside vehicle does not match the identification information of the other platooning vehicle.

15 Claims, 10 Drawing Sheets

(51) Int. Cl.
*H04W 4/46* (2018.01)
*G08G 1/0967* (2006.01)

(56) References Cited

U.S. PATENT DOCUMENTS

| | | |
|---|---|---|
| 2017/0158196 A1 | 6/2017 | Park et al. |
| 2017/0293296 A1 | 10/2017 | Stenneth et al. |
| 2018/0120861 A1 | 5/2018 | Saxena et al. |
| 2018/0211546 A1* | 7/2018 | Smartt .................... H04W 4/46 |
| 2019/0250639 A1* | 8/2019 | Xu ........................ G08G 1/0133 |
| 2020/0021451 A1* | 1/2020 | Pinheiro ................. H04W 4/40 |
| 2020/0092685 A1* | 3/2020 | Fehrenbach ............ H04W 4/46 |
| 2020/0125117 A1* | 4/2020 | Switkes ................. H04W 4/029 |
| 2020/0127820 A1* | 4/2020 | Misoczki ............... H04L 9/0825 |
| 2020/0160723 A1* | 5/2020 | Switkes ............... G05D 1/0027 |
| 2020/0163005 A1* | 5/2020 | Rao ........................ H04W 4/40 |
| 2020/0201356 A1* | 6/2020 | Schuh ..................... B60T 8/171 |
| 2020/0342766 A1* | 10/2020 | Gundavelli .......... G05D 1/0295 |
| 2020/0396782 A1* | 12/2020 | Russell ................... H04L 69/08 |
| 2021/0358308 A1* | 11/2021 | Li ........................... H04W 4/46 |
| 2022/0131803 A1* | 4/2022 | Ko ......................... H04L 47/24 |

FOREIGN PATENT DOCUMENTS

| | | |
|---|---|---|
| CN | 108829107 A | 11/2018 |
| KR | 2006-0053649 A | 5/2006 |
| KR | 2014-0068591 A | 6/2014 |

\* cited by examiner

COMMUNICATION DEVICE FOR PLATOONING IN VEHICLE AND COMMUNICATION METHOD THEREFOR

CROSS-REFERENCE TO RELATED APPLICATION

This application claims the benefit of priority to Korean Patent Application No. 10-2019-0043857, filed in the Korean Intellectual Property Office on Apr. 15, 2019, the entire contents of which are incorporated herein by reference.

TECHNICAL FIELD

The present disclosure relates to an apparatus and method for providing communication between vehicles included in a platooning group.

BACKGROUND

Platooning refers to a plurality of vehicles performing autonomous driving while arranged in line at a specified interval. While the plurality of vehicles perform platooning, a leading vehicle, which is a vehicle located in the front of a platooning line, may control one or more following vehicles which follow the leading vehicle. The leading vehicle may maintain an interval between the plurality of vehicles in the platooning line and may exchange information characterizing behaviors and situations of the plurality of vehicles included in the platooning line using vehicle-to-vehicle (V2V) communication. The leading vehicle may communicate with each of one or more following vehicles included in the platooning group in a one-to-one manner. Furthermore, the leading vehicle may communicate with an outside vehicle which wants to join the platooning group.

A conventional communication mode in a platooning group may only support communication between a leading vehicle and a following vehicle or between the leading vehicle and an outside vehicle and may fail to support communication between the following vehicles or between a following vehicle and an outside vehicle. When communication between a platooning group and outside vehicles is supported, excessive amounts of information may be communicated and processed, thus overloading the communication system.

SUMMARY

The present disclosure has been made to solve the above-mentioned problems occurring in the related art while advantages achieved by the related art are maintained intact.

An aspect of the present disclosure provides an apparatus and method for employing a communication mode for supporting communication with a following vehicle as well as a leading vehicle of a platooning group during platooning.

The technical problems to be solved by the present inventive concept are not limited to the aforementioned problems, and any other technical problems not mentioned herein will be clearly understood from the following description by those skilled in the art to which the present disclosure pertains.

According to embodiments of the present disclosure, a communication device for a platooning vehicle in a platooning group may include: a communication circuit; a memory; and a control circuit electrically connected with the communication circuit and the memory. The control circuit may be configured to: transmit, via the communication circuit, platooning information to another platooning vehicle in the platooning group when platooning is initiated; receive, via the communication circuit, information from an outside vehicle that is not part of the platooning group, the information including identification information of the outside vehicle; process the information received from the outside vehicle when the identification information of the outside vehicle matches identification information of the other platooning vehicle, the identification information of the other platooning vehicle previously stored in a memory of the other platooning vehicle; and stop receiving the information from the outside vehicle when the identification information of the outside vehicle does not match the identification information of the other platooning vehicle.

The control circuit may transmit the platooning information to the other platooning vehicle when the platooning is initiated and when the platooning vehicle is set to a leading vehicle or a following vehicle of the platooning group.

The platooning information may include identification information of the platooning vehicle, information characterizing a role of the platooning vehicle within the platooning group, information characterizing a platooning state of the platooning vehicle, and information characterizing a location of the vehicle within the platooning group.

The control circuit may stop receiving the information from the outside vehicle when the platooning vehicle is a leading vehicle of the platooning group and when the outside vehicle is a leading vehicle of another platooning group.

The control circuit may process the information received from the outside vehicle when the platooning vehicle is a leading vehicle of the platooning group, when the identification information of the outside vehicle does not match the identification information of the other platooning vehicle, and when the outside vehicle is joinable in the platooning group.

The control circuit may process the information received from the outside vehicle when the platooning vehicle is a leading vehicle of the platooning group, when the identification information of the outside vehicle does not match the identification information of the other platooning vehicle, and when no other outside vehicle is available to join the platooning group.

The control circuit may process the information received from the outside vehicle when the platooning vehicle is a following vehicle of the platooning group, when the identification information of the outside vehicle does not match the identification information of the other platooning vehicle, and when the outside vehicle is a leading vehicle of another platooning group.

The control circuit may process the information received from the outside vehicle when the platooning vehicle is a following vehicle of the platooning group, when the identification information of the outside vehicle does not match the identification information of the other platooning vehicle, and when the outside vehicle is a leading vehicle of another platooning group, and when the outside vehicle is joinable in the platooning group.

The control circuit may reset the identification information of each vehicle in the platooning group according to an arranged order in the platooning group when the identification information of the outside vehicle does not match the identification information of the other platooning vehicle and when the outside vehicle joins the platooning group.

The control circuit may initialize identification information assigned to an outside vehicle which withdraws from the platooning group when the identification information of the outside vehicle matches the identification information of the other platooning vehicle and when the outside vehicle withdraws from the platooning group; and reset the identification information of each vehicle in the platooning group according to an arranged order in the platooning group.

Furthermore, according to embodiments of the present disclosure, a communication method for a platooning vehicle in a platooning group may include: transmitting, via a communication circuit, platooning information to another platooning vehicle in the platooning group when platooning is initiated; receiving, via the communication circuit, information from an outside vehicle that is not part of the platooning group, the information including identification information of the outside vehicle; processing the information received from the outside vehicle when the identification information of the outside vehicle matches identification information of the other platooning vehicle, the identification information of the other platooning vehicle previously stored in a memory of the other platooning vehicle; and stopping receiving the information from the outside vehicle when the identification information of the outside vehicle does not match the identification information of the other platooning vehicle.

The transmitting of the platooning information may include transmitting, via the communication circuit, the platooning information to the other platooning vehicle when the platooning is initiated and when the platooning vehicle is set to a leading vehicle or a following vehicle of the platooning group.

The platooning information may include identification information of the platooning vehicle, information characterizing a role of the platooning vehicle within the platooning group, information characterizing a platooning state of the platooning vehicle, and information characterizing a location of the vehicle within the platooning group.

The communication method may further include processing the information received from the outside vehicle when the platooning vehicle is a leading vehicle of the platooning group and when no other outside vehicle is available to join the platooning group.

The communication method may further include processing the information received from the outside vehicle when the platooning vehicle is a following vehicle of the platooning group, when the identification information of the outside vehicle does not match the identification information of the other platooning vehicle, and when the outside vehicle is a leading vehicle of another platooning group.

BRIEF DESCRIPTION OF THE DRAWINGS

The above and other objects, features and advantages of the present disclosure will be more apparent from the following detailed description taken in conjunction with the accompanying drawings.

Figure 1:
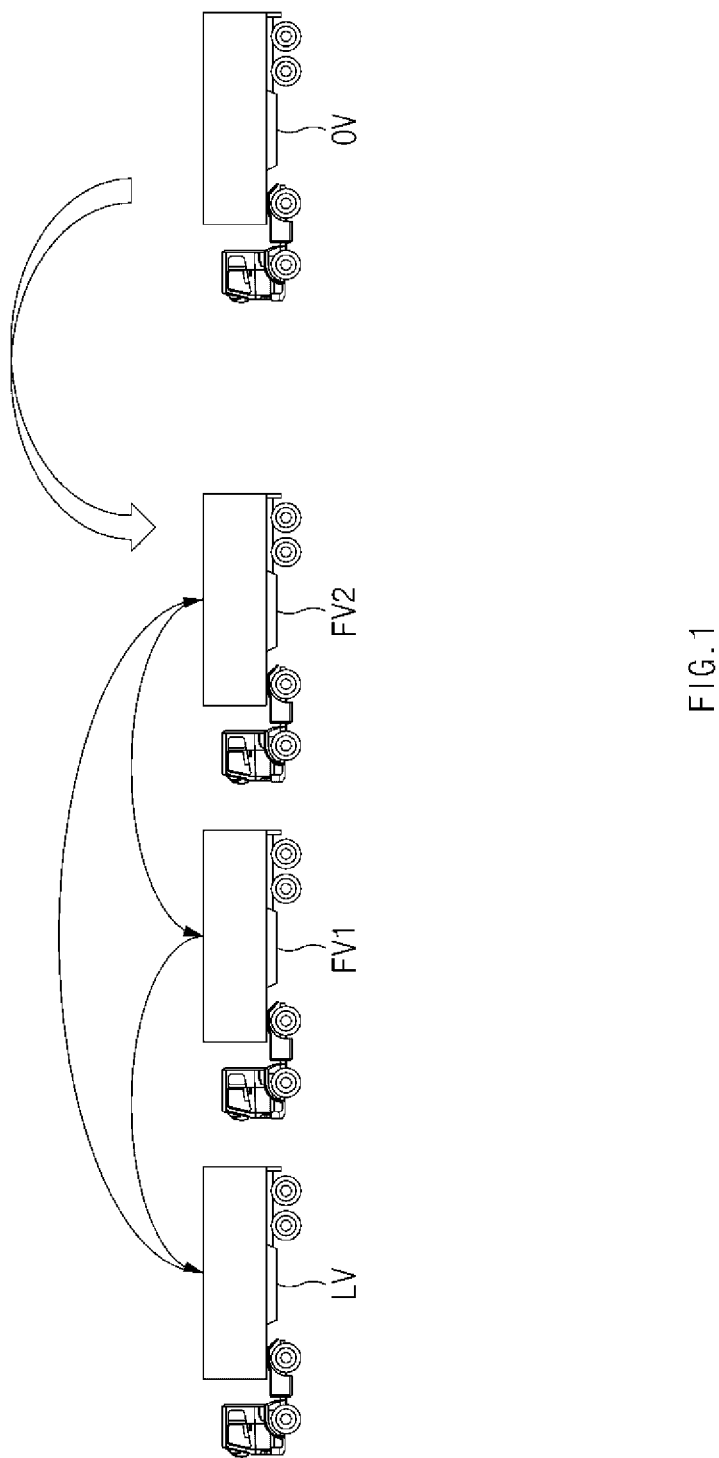
FIG. 1 is a drawing illustrating an environment where a communication device for platooning in a vehicle is operated, according to embodiments of the present disclosure.

It should be understood that the above-referenced drawings are not necessarily to scale, presenting a somewhat simplified representation of various preferred features illustrative of the basic principles of the disclosure. The specific design features of the present disclosure, including, for example, specific dimensions, orientations, locations, and shapes, will be determined in part by the particular intended application and use environment.

DETAILED DESCRIPTION OF THE EMBODIMENTS

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

Additionally, it is understood that one or more of the below methods, or aspects thereof, may be executed by at least one control circuit. The term "control circuit" may refer to a hardware device that includes a processor. The processor is specifically programmed to execute program instructions stored in memory to perform one or more processes which are described further below. The control circuit may control operation of units, modules, parts, devices, or the like, as described herein. Moreover, it is understood that the below methods may be executed by an apparatus comprising the control circuit in conjunction with one or more other components, as would be appreciated by a person of ordinary skill in the art.

Referring now to the presently disclosed embodiments, FIG. 1 is a drawing illustrating an environment where a communication device for platooning in a vehicle, also referred to herein as a "platooning vehicle," is operated, according to embodiments of the present disclosure.

As shown in FIG. 1, a leading vehicle LV, a first following vehicle FV1, and a second following vehicle FV2 may form a platooning group. The leading vehicle LV may communicate with each of the first following vehicle FV1 and the second following vehicle FV2, and the first following vehicle FV1 may communicate with the second following vehicle FV2. A vehicle included in the platooning group may identify information transmitted by the vehicle included in the platooning group in information, broadcast from the outside, using identification information of the vehicle. Each of the leading vehicle LV, the first following vehicle FV1, and the second following vehicle FV2 may selectively receive and process information broadcast from the vehicle included in the platooning group.

An outside vehicle OV may broadcast information to the outside. The outside vehicle OV may be a vehicle which is not included in the above-mentioned platooning group. When information is received from the outside vehicle OV, each of the leading vehicle LV, the first following vehicle FV1, and the second following vehicle FV2 may identify identification information of the outside vehicle OV and may determine whether the outside vehicle OV is a vehicle included in the platooning group. When it is determined that the outside vehicle OV is not included in the platooning group, each of the leading vehicle LV, the first following vehicle FV1, and the second following vehicle FV2 may stop receiving information from the outside vehicle OV.

When the outside vehicle OV wants to join the above-mentioned platooning group, the leading vehicle LV may receive and process information from the outside vehicle OV depending on a situation. When the outside vehicle OV is a leading vehicle of another platooning group, each of the first following vehicle FV1 and the second following vehicle FV2 may receive and process information from the outside vehicle OV depending on a situation. Each of the first following vehicle FV1 and the second following vehicle FV2 may join the platooning group of the outside vehicle OV using the information received from the outside vehicle OV. A description will be given below in detail of receiving and processing the information and stopping receiving the information.

Figure 2:
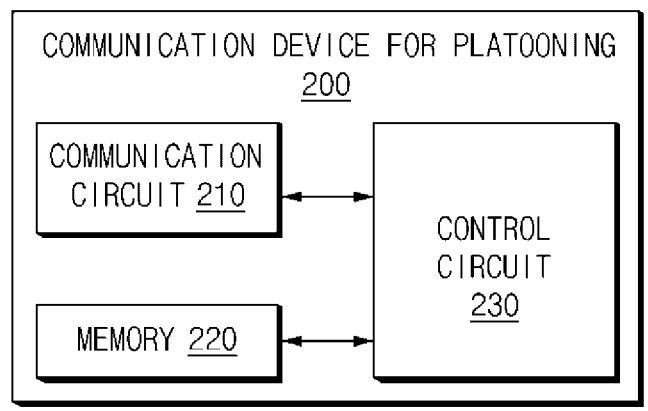
FIG. 2 is a block diagram illustrating a configuration of a communication device for platooning in a vehicle according to embodiments of the present disclosure.

FIG. 2 is a block diagram illustrating a configuration of a communication device for platooning in a vehicle according to embodiments of the present disclosure.

As shown in FIG. 2, a communication device 200 for platooning in a vehicle according to embodiments of the present disclosure may include a communication circuit 210, a memory 220, and a control circuit 230. The communication device 200 for platooning may be loaded into a vehicle which supports the platooning.

The communication circuit 210 may be configured to communicate with other communication-enabled devices. For example, the communication circuit 210 may be, for example, a circuit which supports vehicle-to-vehicle (V2V) communication and may wirelessly communicate with an outside vehicle.

The memory 220 may include a volatile and/or non-volatile memory. The memory 220 may store information associated with platooning, for example, identification information of each of vehicles included in a platooning group. The memory 220 may store instructions executable by the control circuit 230.

The control circuit 230 may be electrically connected with the communication circuit 210 and the memory 220. The control circuit 230 may control the communication circuit 210 and the memory 220 and may perform a variety of data processing and various arithmetic operations. The control circuit 230 may be, for example, an electronic control unit (ECU), a micro controller unit (MCU), or a sub-controller, which is loaded into the vehicle.

According to embodiments of the present disclosure, when initiating platooning, the control circuit 230 may transmit platooning information to another vehicle included in a platooning group using the communication circuit 210. The control circuit 230 may broadcast the platooning information to the outside. When the vehicle is set to a leading vehicle or a following vehicle of the platooning group, that is, when a role of the vehicle within the platooning group is determined, the control circuit 230 may transmit the platooning information to another vehicle included in the platooning group.

The platooning information may include information associated with platooning, for example, identification information of the vehicle, information characterizing a role of the vehicle within the platooning group, information characterizing a platooning state of the vehicle associated with the platooning, and information characterizing a location of the vehicle within the platooning group. The identification information of the vehicle may be an ID assigned in the platooning group. The information characterizing the role may be information indicating whether the vehicle is a leading vehicle or a following vehicle in the platooning group. The information characterizing the platooning state may be information indicating whether the vehicle is in a state where it is able to currently perform the platooning, where it is unable to currently perform the platooning, or where it is maintaining the platooning. The information characterizing the location may be information indicating whether the vehicle is located in an nth line in the platooning group.

The control circuit 230 may receive information from an outside vehicle that is not part of the platooning group using the communication circuit 210. The control circuit 230 may receive information broadcast from the outside vehicle. The information broadcast from the outside vehicle may be information associated with platooning.

When the vehicle is a leading vehicle of the platooning group and when the outside vehicle is another leading vehicle, the control circuit 230 may stop receiving the information. Because it is unnecessary to perform communication between leading vehicles during platooning, the control circuit 230 of the leading vehicle may fail to receive information from the outside leading vehicle.

When identification information of the outside vehicle is matched with identification information previously stored in a memory of another vehicle included in the platooning group, also referred to herein as "the other platooning vehicle," the control circuit 230 may process information received from the matched outside vehicle. The control circuit 230 may store identification information of each of other vehicles included in the platooning group in the memory 220. The control circuit 230 may compare the identification information of the outside vehicle which transmits information with the previously stored identification information to determine whether the outside vehicle is a vehicle included in the platooning group. When the identification information of the outside vehicle is matched with the previously stored identification information, because the outside vehicle is the vehicle included in the platooning group, the control circuit 230 may process information received from the matched outside vehicle.

When the identification information of the outside vehicle is mismatched with identification information of another vehicle included in the platooning group, the control circuit 230 may stop receiving information from the mismatched outside vehicle. When the identification information of the outside vehicle is mismatched with the previously stored identification information, because the outside vehicle is not the vehicle included in the platooning group, the control circuit 230 may stop receiving unnecessary information from the mismatched outside vehicle.

When the vehicle is a leading vehicle of the platooning group and when the mismatched outside vehicle is joinable in the platooning group, the control circuit 230 may process information received from the mismatched outside vehicle. When the vehicle is a leading vehicle of the platooning group and when there is no another outside vehicle which is available to join the platooning group, the control circuit 230 may process information received from the mismatched outside vehicle. As a result, the control circuit 230 of the leading vehicle may receive information transmitted to join the platooning group from the outside vehicle.

When the vehicle is a following vehicle of the platooning group and when the mismatched outside vehicle is a leading vehicle, the control circuit 230 may process information received from the mismatched outside vehicle. When the vehicle is a following vehicle of the platooning group and when the mismatched outside vehicle is a leading vehicle which is joinable in the platooning group, the control circuit 230 may process information received from the mismatched outside vehicle. As a result, the control circuit 230 of the following vehicle may receive information received from a leading vehicle of another platooning group and may join the other platooning group using the received information.

When the mismatched outside vehicle joins the platooning group, the control circuit 230 may reset identification information of each of vehicles included in the platooning group in an arranged order in the platooning group. For example, when the vehicles included in the platooning group is arranged in an order of a leading vehicle, a first following vehicle, and a second following vehicle of the platooning group and when the outside vehicle joins behind the second following vehicle, the control circuit 230 may reset the identification information in an order of the leading vehicle, the first following vehicle, the second following vehicle, and the outside vehicle.

When the matched outside vehicle withdraws from the platooning group, the control circuit 230 may initialize identification information assigned to the withdrawn outside vehicle and may reset identification information of each of vehicles included in the platooning group in an arranged order in the platooning group. For example, when the first following vehicle among the leading vehicle, the first following vehicle, and the second following vehicle of the platooning group withdraws from the platooning group, the control circuit 230 may initialize an ID assigned to the first following vehicle (e.g., set FV1_ID to "0") and may reset the identification information in an order of the leading vehicle and the second following vehicle.

Figure 3:
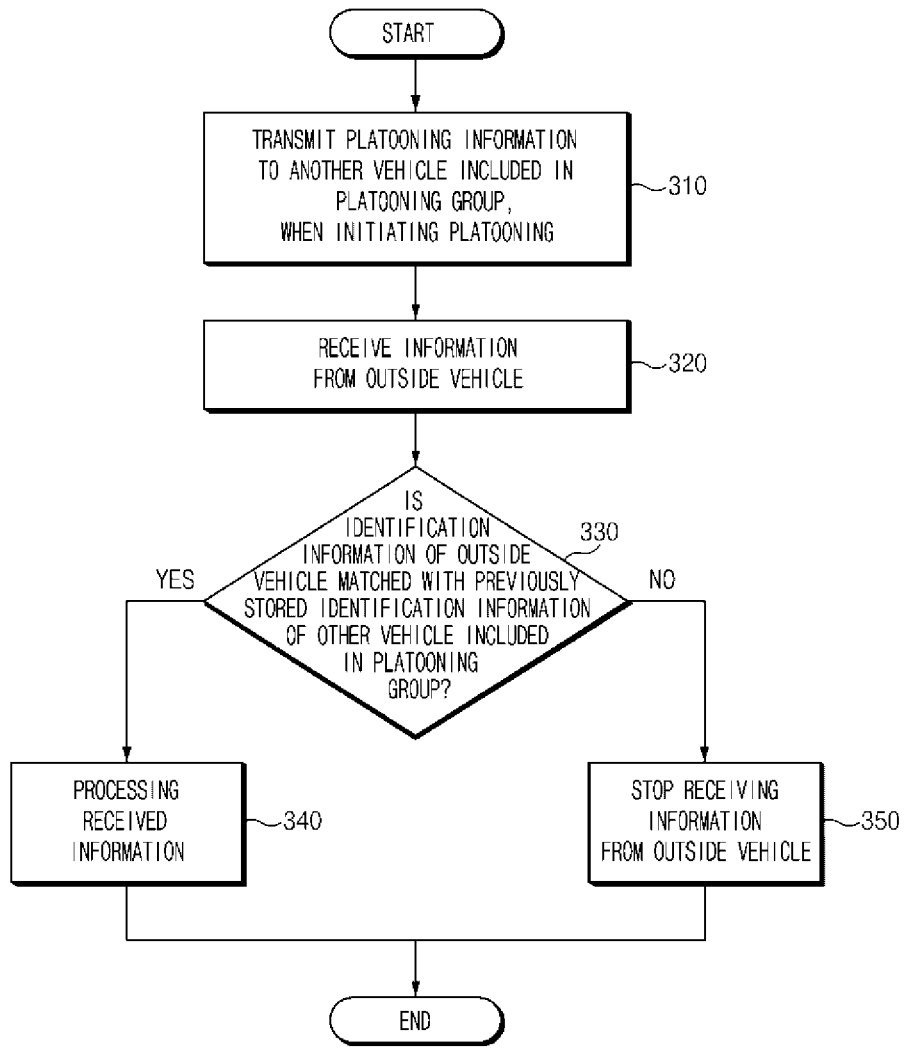
FIG. 3 is a flowchart illustrating a communication method for platooning in a vehicle according to embodiments of the present disclosure.

FIG. 3 is a flowchart illustrating a communication method for platooning in a vehicle according to embodiments of the present disclosure.

Hereinafter, it is assumed that a vehicle including a communication device 200 for platooning in FIG. 2 performs a process of FIG. 3. Furthermore, in a description of FIG. 3, an operation described as being performed by the vehicle may be understood as being controlled by a control circuit 230 of the communication device 200 for platooning.

As shown in FIG. 3, in operation 310, when initiating platooning, the vehicle may transmit platooning information to another vehicle included in a platooning group. For example, the vehicle may broadcast the platooning information to the outside.

In operation 320, the vehicle may receive information from an outside vehicle. For example, the vehicle may receive platooning information of the outside vehicle, broadcast from the outside vehicle.

In operation 330, the vehicle may determine whether identification information of the outside vehicle is matched with previously stored identification information of another vehicle included in the platooning group. For example, the vehicle may compare the identification information with the previously stored identification information to determine whether the outside vehicle is a vehicle included in the platooning group.

When the identification information of the outside vehicle is matched with the previously stored identification information, the vehicle may process information received from the matched outside vehicle. For example, the vehicle may process the information received from the outside vehicle included in the platooning group.

When the identification information of the outside vehicle is mismatched with the previously stored identification information, the vehicle may stop receiving the information from the mismatched outside vehicle. For example, the vehicle may stop receiving the information from the outside vehicle which is not included in the platooning group.

Figure 4:
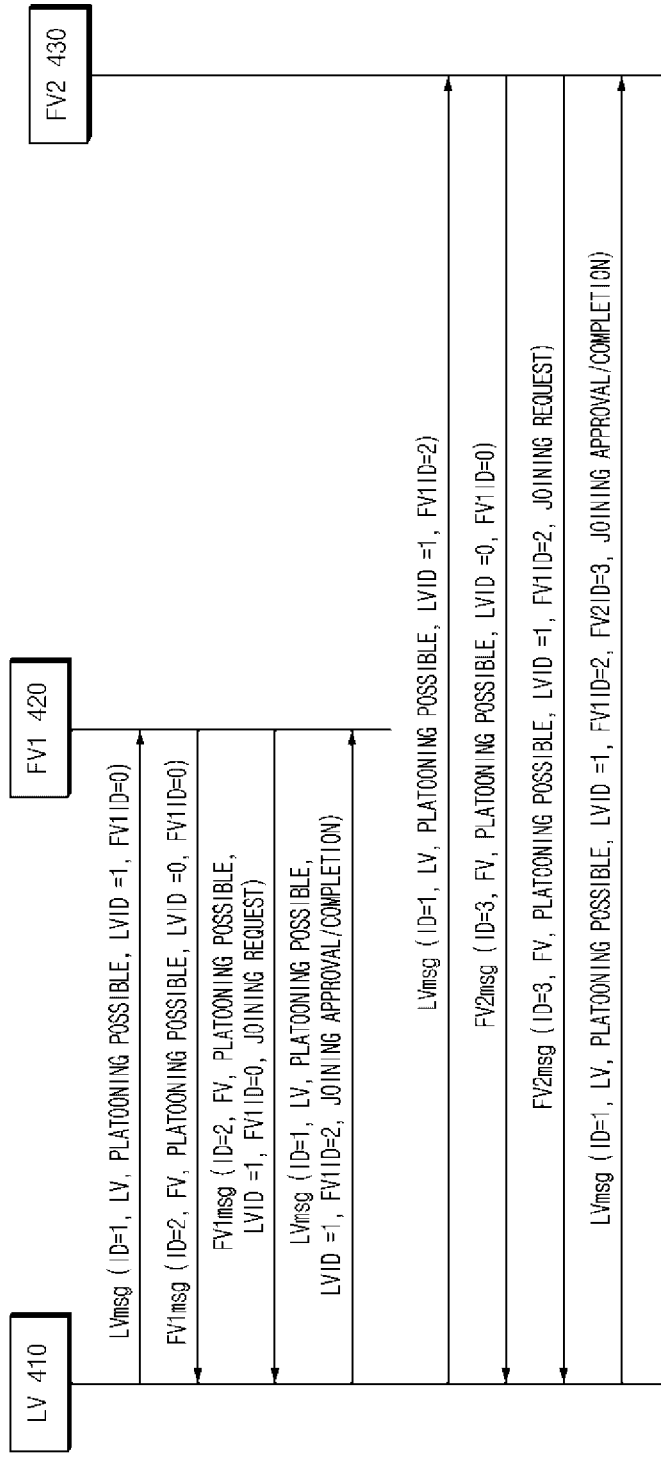
FIG. 4 is a signal sequence diagram illustrating a communication method for platooning in a vehicle according to embodiments of the present disclosure.

FIG. 4 is a signal sequence diagram illustrating a communication method for platooning in a vehicle according to embodiments of the present disclosure.

As shown in FIG. 4, LV 410 may broadcast a message including platooning information of LV 410 to the outside. The message may include information associated with an ID of the vehicle, a role of the vehicle within a group (e.g., LV or FV), a platooning state of the vehicle (e.g., platooning possible, platooning impossible, or platooning keeping), a location of the vehicle within the group (e.g., LV, FV1, FV2, or PFV), or the like. FV1 420 may receive a message from LV 410. FV1 420 may broadcast a message including platooning information of FV1 420 to the outside. LV 410 may receive the message of FV1 420. FV1 420 may transmit a joining request to LV 410. FV1 420 may assign "1" which is an ID of LV 410 to LVID. LVID may refer to an ID of LV in a platooning group. LV 410 may approve and complete the joining and may assign "2" which is an ID of FV1 420 to FV1ID. FV1ID may refer to an ID of a first FV in the platooning group.

FV2 430 may receive the message of LV 410 in a similar manner LV 410 may receive a message of FV2 430. FV2 may transmit a joining request to LV 410. LV 410 may approve and complete the joining and may assign "3" which is an ID of FV2 to FV2ID. FV2ID may refer to an ID of a second FV in the platooning group.

Figure 5:
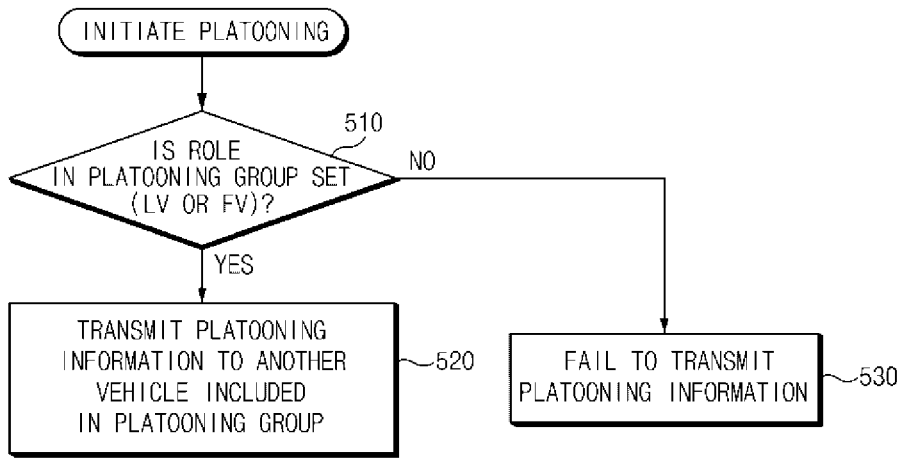
FIG. 5 is a flowchart illustrating a communication method for platooning in a vehicle according to embodiments of the present disclosure.

FIG. 5 is a flowchart illustrating a communication method for platooning in a vehicle according to embodiments of the present disclosure.

Hereinafter, it is assumed that a vehicle including a communication device 200 for platooning in FIG. 2 performs a process of FIG. 5. Furthermore, in a description of FIG. 5, an operation described as being performed by the vehicle may be understood as being controlled by a control circuit 230 of the communication device 200 for platooning.

As shown in FIG. 5, in operation 510, after initiating platooning, the vehicle may determine whether a role of the vehicle within a platooning group is set. For example, the vehicle may determine whether the vehicle is set to a leading vehicle or a following vehicle in the platooning group.

When the role is set, in operation 520, the vehicle may transmit platooning information to another vehicle included in the platooning group. For example, the vehicle may broadcast the platooning information to the outside. When the role is not set, in operation 530, the vehicle may fail to transmit the platooning information.

Figure 6:
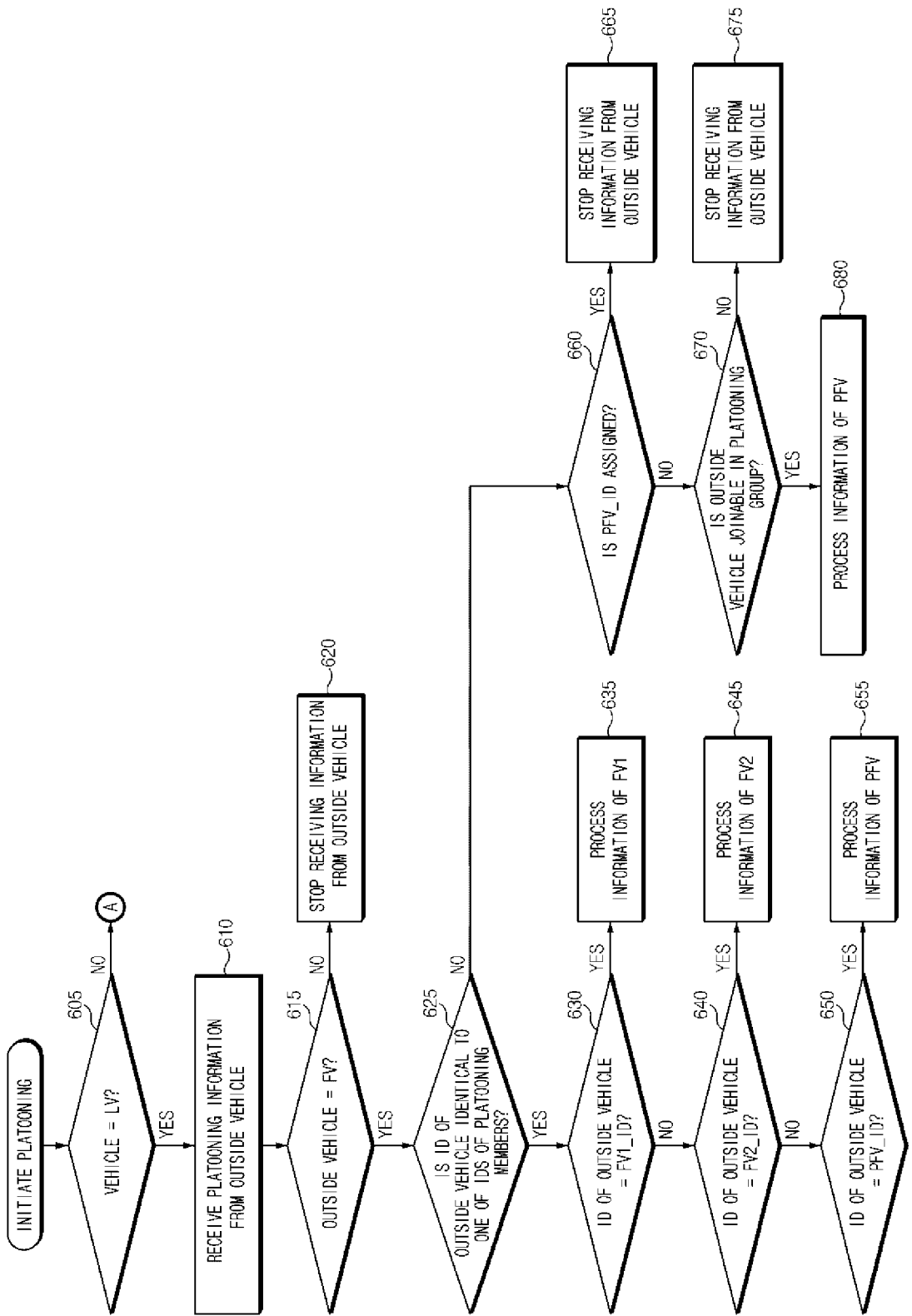
FIG. 6 is a flowchart illustrating a communication method for platooning in a vehicle according to embodiments of the present disclosure.

FIG. 6 is a flowchart illustrating a communication method for platooning in a vehicle according to embodiments of the present disclosure.

Hereinafter, it is assumed that a vehicle including a communication device 200 for platooning in FIG. 2 performs a process of FIG. 6. Furthermore, in a description of FIG. 6, an operation described as being performed by the vehicle may be understood as being controlled by a control circuit 230 of the communication device 200 for platooning.

As shown in FIG. 6, in operation 605, the vehicle may determine whether it is a leading vehicle LV. When the vehicle is the leading vehicle LV, it may perform a process of operations 610 to 680. When the vehicle is not the leading vehicle LV, it may perform a process of FIG. 7.

In operation 610, the vehicle may receive platooning information from an outside vehicle. In operation 615, the vehicle may determine whether the outside vehicle is a following vehicle FV. When the outside vehicle is not the following vehicle FV, that is, when the outside vehicle is a leading vehicle LV of another group, in operation 620, the vehicle may stop receiving the information from the outside vehicle. When the outside vehicle is the following vehicle FV, in operation 625, the vehicle may determine whether an ID of the outside vehicle is identical to one of IDs of platooning members. The vehicle may determine whether the outside vehicle is the platooning member using the ID.

When the ID of the outside vehicle is identical to the one of the IDs of the platooning members, that is, when the outside vehicle is the platooning member, in operations 630, 640, and 650, the vehicle may sequentially determine whether the ID of the outside vehicle is identical to FV1_ID, FV2_ID, or PFV_ID. FV UD may refer to an ID of a first following vehicle in the platooning group. FV2_ID may refer to an ID of a second following vehicle in the platooning group. PFV_ID may refer to an ID of a vehicle which is performing a process of joining the platooning group. In operation 635, 645, or 655, the vehicle may process information of FV1, FV2, or PFV (information of an outside vehicle) depending on the ID of the outside vehicle.

When the ID of the outside vehicle is not identical to the one of the IDs of the platooning members, that is, when the outside vehicle is not the platooning member, in operation 660, the vehicle may determine whether PFV_ID is assigned. Because PFV_ID is assigned when the process of joining the platooning group is in progress, it is impossible to proceed with another joining process while PFV_ID is assigned. When PFV_ID is assigned, in operation 665, the vehicle may stop receiving the information from the outside vehicle. When PFV_ID is not assigned, because it is possible to for a new member to join the platooning group, in operation 670, the vehicle may determine whether the outside vehicle is joinable in the platooning group. When the outside vehicle is not joinable in the platooning group, in operation 675, the vehicle may stop receiving the information from the outside vehicle. When the outside vehicle is joinable in the platooning group, in operation 680, the vehicle may process information of PFV (information of the outside vehicle).

Figure 7:
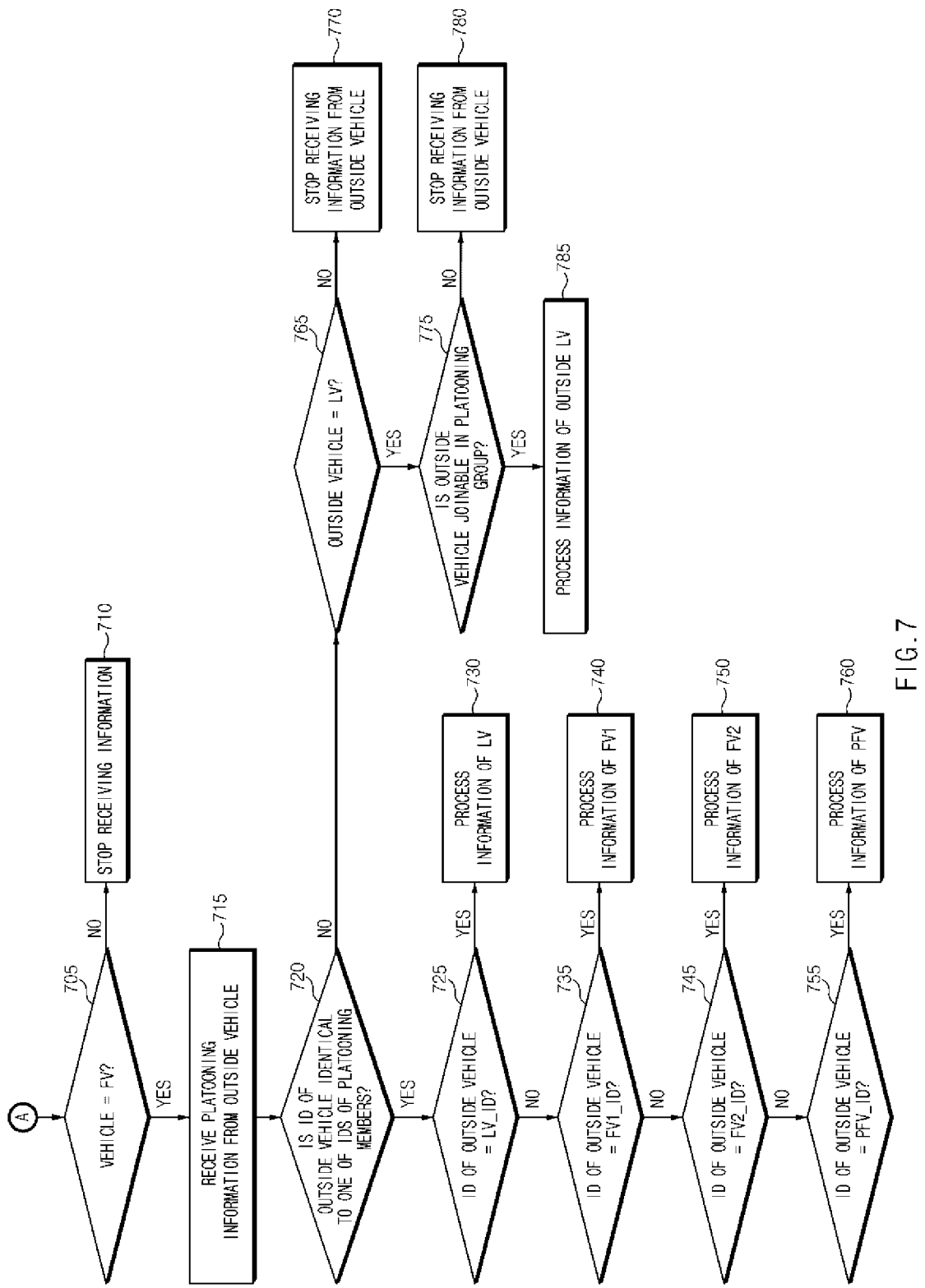
FIG. 7 is a flowchart illustrating a communication method for platooning in a vehicle according to embodiments of the present disclosure.

FIG. 7 is a flowchart illustrating a communication method for platooning in a vehicle according to embodiments of the present disclosure.

Hereinafter, it is assumed that a vehicle including a communication device 200 for platooning in FIG. 2 performs a process of FIG. 7. Furthermore, in a description of FIG. 7, an operation described as being performed by the vehicle may be understood as being controlled by a control circuit 230 of the communication device 200 for platooning.

As shown in FIG. 7, in operation 705, the vehicle may determine whether it is a following vehicle FV. When the vehicle is not a leading vehicle LV and the following vehicle FV, in operation 710, it may stop receiving information associated with platooning.

When the vehicle is the following vehicle FV, in operation 715, the vehicle may receive platooning information from an outside vehicle. In operation 720, the vehicle may determine whether an ID of the outside vehicle is identical to one of IDs of platooning members.

When the ID of the outside vehicle is identical to the one of the IDs of the platooning members, that is, when the outside vehicle is the platooning member, in operations 725, 735, 745, and 755, the vehicle may sequentially determine whether the ID of the outside vehicle is identical to LV_ID, FV1_ID, FV2_ID, or PFV_ID. LV_ID may refer to an ID of a leading vehicle LV in a platooning group. In operation 730, 740, 750, or 760, the vehicle may process information of LV, FV1, FV2, or PFV (information of the outside vehicle) depending on the ID of the outside vehicle.

When the ID of the outside vehicle is not identical to the one of the IDs of the platooning group, that is, when the outside vehicle is not the platooning member, in operation 765, the vehicle may determine whether the outside vehicle is a leading vehicle LV of another group. When the outside vehicle is the leading vehicle LV of the other group, there is a probability that the vehicle will join the other group. When the outside vehicle is not the leading vehicle LV, in operation 770, the vehicle may stop receiving the information from the outside vehicle. When the outside vehicle is the leading vehicle LV, in operation 775, the vehicle may determine whether the outside vehicle is joinable in the platooning group. When the outside vehicle is not joinable in the platooning group, in operation 780, the vehicle may stop receiving the information from the outside vehicle. When the outside vehicle is joinable in the platooning group, in operation 785, the vehicle may process information of an outside leading vehicle. The vehicle may request the outside vehicle to join the platooning group using the processed information.

Figure 8:
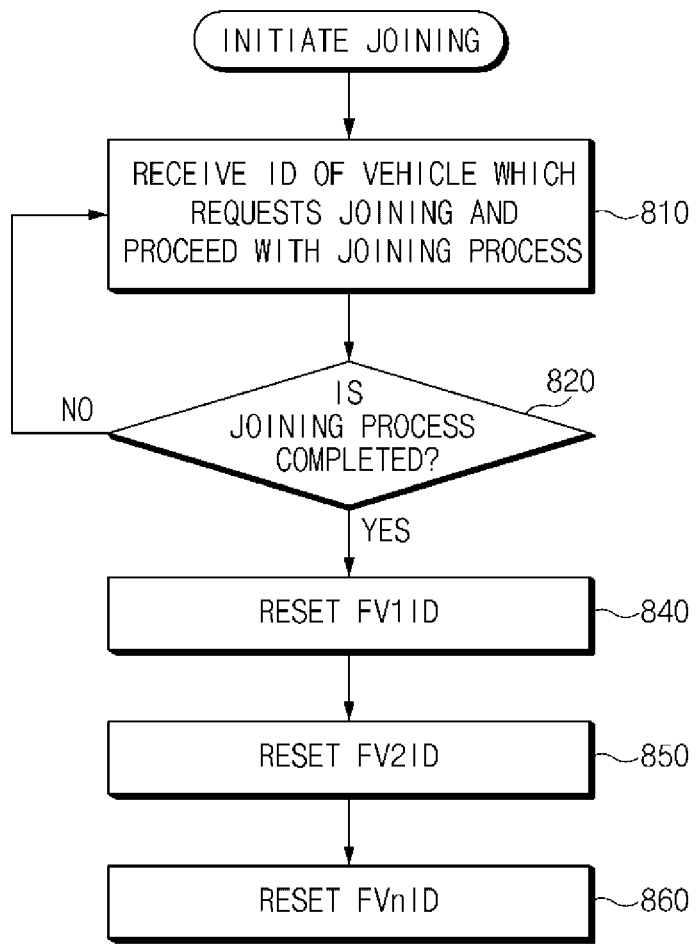
FIG. 8 is a flowchart illustrating a communication method for platooning in a vehicle according to embodiments of the present disclosure.

FIG. 8 is a flowchart illustrating a communication method for platooning in a vehicle according to embodiments of the present disclosure.

Hereinafter, it is assumed that a vehicle including a communication device 200 for platooning in FIG. 2 performs a process of FIG. 8. Furthermore, in a description of FIG. 8, an operation described as being performed by the vehicle may be understood as being controlled by a control circuit 230 of the communication device 200 for platooning.

As shown in FIG. 8, in operation 810, the vehicle may receive an ID of a vehicle which requests joining and may proceed with a joining process. In operation 820, the vehicle may determine whether the joining process is completed. When the joining process is completed, in operations 840, 850, and 860, the vehicle may sequentially reset IDs (e.g., FV1ID, FV2ID, and FVnID) of following vehicles in a platooning group. FV1ID may refer to an ID of a first following vehicle in the platooning group. FV2ID may refer to an ID of a second following vehicle in the platooning group. FVnID may refer to an ID of an nth following vehicle in the platooning group. The vehicle may assign the ID of the first following vehicle to FV1ID, may assign the ID of the second following vehicle to FV2ID, and may assign the ID of the nth following vehicle to FVnID, depending on an order where following vehicles are arranged.

Figure 9:
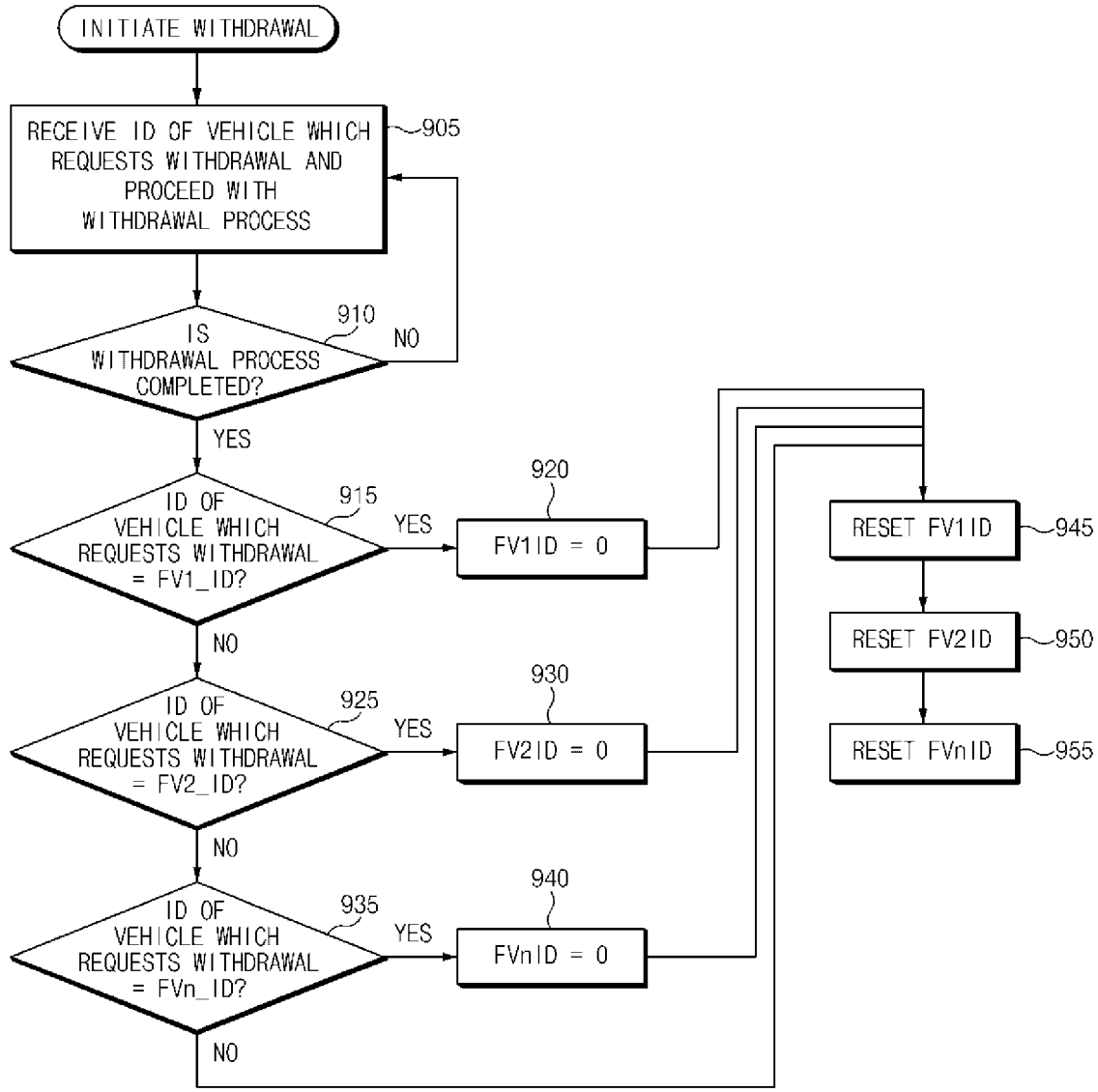
FIG. 9 is a flowchart illustrating a communication method for platooning in a vehicle according to embodiments of the present disclosure.

FIG. 9 is a flowchart illustrating a communication method for platooning in a vehicle according to embodiments of the present disclosure.

Hereinafter, it is assumed that a vehicle including a communication device 200 for platooning in FIG. 2 performs a process of FIG. 9. Furthermore, in a description of FIG. 9, an operation described as being performed by the vehicle may be understood as being controlled by a control circuit 230 of the communication device 200 for platooning.

As shown in FIG. 9, in operation 905, the vehicle may receive an ID of a vehicle which requests withdrawal and may proceed with a withdrawal process. In operation 910, the vehicle may determine whether the withdrawal process is completed. When the withdrawal process is completed, in operations 915, 925, and 935, the vehicle may sequentially determine whether an ID of the vehicle which requests the withdrawal is identical to FVLID, FV2_ID, or FVn_ID. In operation 920, 930, or 940, the vehicle may initialize an ID identical to the ID of the vehicle which requests the withdrawal (set the ID to "0") among FV1_ID, FV2_ID, or FVn_ID. In operations 945, 950, or 955, the vehicle may sequentially reset IDs (e.g., FV1ID, FV2ID, and FVnID) of following vehicles in a platooning group.

Figure 10:
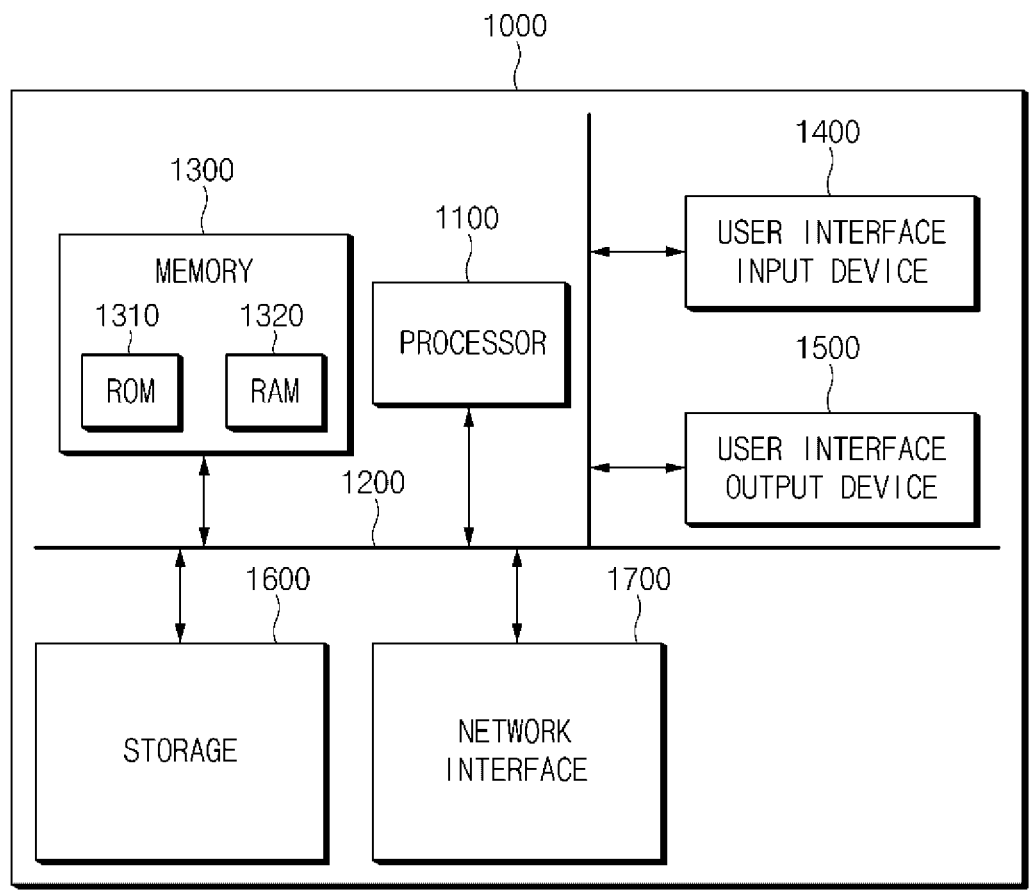
FIG. 10 is a block diagram illustrating a configuration of a computing system according to embodiments of the present disclosure.

FIG. 10 is a block diagram illustrating a configuration of a computing system according to embodiments of the present disclosure.

As shown in FIG. 10, the above-mentioned method according to embodiments of the present disclosure may be implemented by means of the computing system. The computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

Embodiments of the present disclosure may selectively process information received from the outside using identification information of the vehicle to provide a communication mode which supports communication between following vehicles in a platooning group.

In addition, various effects directly or indirectly ascertained through the present disclosure may be provided.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed on the basis of the accompanying claims, and all the technical ideas within the scope equivalent to the claims should be included in the scope of the present disclosure.

What is claimed is:

1. A communication device for a platooning vehicle in a platooning group, the communication device comprising:
   a communication circuit;
   a memory; and
   a control circuit electrically connected with the communication circuit and the memory, wherein the control circuit is configured to:
   transmit, via the communication circuit, platooning information to another platooning vehicle in the platooning group when platooning is initiated;
   receive, via the communication circuit, information from an outside vehicle that is not part of the platooning group, the information including identification information of the outside vehicle;
   process the information received from the outside vehicle when the identification information of the outside vehicle matches identification information of the another platooning vehicle, the identification information of the another platooning vehicle previously stored in a memory of the another platooning vehicle; and
   stop processing the information from the outside vehicle when the identification information of the outside vehicle does not match the identification information of the another platooning vehicle.

2. The communication device of claim 1, wherein the control circuit is configured to:
   transmit the platooning information to the another platooning vehicle when the platooning is initiated and when the platooning vehicle is set to a leading vehicle or a following vehicle of the platooning group.

3. The communication device of claim 1, wherein the platooning information includes identification information of the platooning vehicle, information characterizing a role of the platooning vehicle within the platooning group, information characterizing a platooning state of the platooning vehicle, and information characterizing a location of the vehicle within the platooning group.

4. The communication device of claim 1, wherein the control circuit is configured to:
stop receiving the information from the outside vehicle when the platooning vehicle is a leading vehicle of the platooning group and when the outside vehicle is a leading vehicle of another platooning group.

5. The communication device of claim 1, wherein the control circuit is configured to:
process the information received from the outside vehicle when the platooning vehicle is a leading vehicle of the platooning group, when the identification information of the outside vehicle does not match the identification information of the another platooning vehicle, and when the outside vehicle is joinable in the platooning group.

6. The communication device of claim 1, wherein the control circuit is configured to:
process the information received from the outside vehicle when the platooning vehicle is a leading vehicle of the platooning group, when the identification information of the outside vehicle does not match the identification information of the another platooning vehicle, and when no other outside vehicle is available to join the platooning group.

7. The communication device of claim 1, wherein the control circuit is configured to:
process the information received from the outside vehicle when the platooning vehicle is a following vehicle of the platooning group, when the identification information of the outside vehicle does not match the identification information of the another platooning vehicle, and when the outside vehicle is a leading vehicle of another platooning group.

8. The communication device of claim 1, wherein the control circuit is configured to:
process the information received from the outside vehicle when the platooning vehicle is a following vehicle of the platooning group, when the identification information of the outside vehicle does not match the identification information of the another platooning vehicle, and when the outside vehicle is a leading vehicle of another platooning group, and when the outside vehicle is joinable in the platooning group.

9. The communication device of claim 1, wherein the control circuit is configured to:
reset the identification information of each vehicle in the platooning group according to an arranged order in the platooning group when the identification information of the outside vehicle does not match the identification information of the another platooning vehicle and when the outside vehicle joins the platooning group.

10. The communication device of claim 1, wherein the control circuit is configured to:
initialize identification information assigned to an outside vehicle which withdraws from the platooning group when the identification information of the outside vehicle matches the identification information of the another platooning vehicle and when the outside vehicle withdraws from the platooning group; and
reset the identification information of each vehicle in the platooning group according to an arranged order in the platooning group.

11. A communication method for a platooning vehicle in a platooning group, the communication method comprising:
transmitting, via a communication circuit, platooning information to another platooning vehicle in the platooning group when platooning is initiated;
receiving, via the communication circuit, information from an outside vehicle that is not part of the platooning group, the information including identification information of the outside vehicle;
processing, by a control circuit electrically connected with the communication circuit, the information received from the outside vehicle when the identification information of the outside vehicle matches identification information of the another platooning vehicle, the identification information of the another platooning vehicle previously stored in a memory of the another platooning vehicle; and
stopping processing, by the control circuit, the information from the outside vehicle when the identification information of the outside vehicle does not match the identification information of the another platooning vehicle.

12. The communication method of claim 11, wherein the transmitting of the platooning information comprises:
transmitting, via the communication circuit, the platooning information to the another platooning vehicle when the platooning is initiated and when the platooning vehicle is set to a leading vehicle or a following vehicle of the platooning group.

13. The communication method of claim 11, wherein the platooning information includes identification information of the platooning vehicle, information characterizing a role of the platooning vehicle within the platooning group, information characterizing a platooning state of the platooning vehicle, and information characterizing a location of the vehicle within the platooning group.

14. The communication method of claim 11, further comprising:
processing the information received from the outside vehicle when the platooning vehicle is a leading vehicle of the platooning group and when no other outside vehicle is available to join the platooning group.

15. The communication method of claim 11, further comprising:
processing the information received from the outside vehicle when the platooning vehicle is a following vehicle of the platooning group, when the identification information of the outside vehicle does not match the identification information of the another platooning vehicle, and when the outside vehicle is a leading vehicle of another platooning group.

* * * * *